United States Patent
Amako et al.

(10) Patent No.: US 11,326,066 B2
(45) Date of Patent: May 10, 2022

(54) INK COMPOSITION FOR PTP PACKAGE, AND INK

(71) Applicant: YAMAMOTO CHEMICALS, INC., Yao (JP)

(72) Inventors: Takamichi Amako, Yao (JP); Masayuki Ezoe, Yao (JP)

(73) Assignee: YAMAMOTO CHEMICALS, INC., Yao (JP)

( * ) Notice: Subject to any disclaimer, the term of this patent is extended or adjusted under 35 U.S.C. 154(b) by 335 days.

(21) Appl. No.: 16/479,646

(22) PCT Filed: Jan. 20, 2018

(86) PCT No.: PCT/JP2018/001692
§ 371 (c)(1),
(2) Date: Jul. 22, 2019

(87) PCT Pub. No.: WO2018/135652
PCT Pub. Date: Jul. 26, 2018

(65) Prior Publication Data
US 2021/0332253 A1    Oct. 28, 2021

(30) Foreign Application Priority Data
Jan. 23, 2017    (JP) .............................. JP2017-009399

(51) Int. Cl.
*C09D 11/037*    (2014.01)
*C09D 11/102*    (2014.01)
(Continued)

(52) U.S. Cl.
CPC ............ *C09D 11/037* (2013.01); *B65D 65/42* (2013.01); *B65D 75/32* (2013.01); *C09B 47/045* (2013.01);
(Continued)

(58) Field of Classification Search
CPC ........................... C09D 11/037; C09D 11/102
See application file for complete search history.

(56) References Cited

U.S. PATENT DOCUMENTS

| | | | |
|---|---|---|---|
| 5,648,414 A | * | 7/1997 | Bier ..................... C09D 11/102 524/323 |
| 8,722,292 B2 | | 5/2014 | Seitoku |
| 2009/0011354 A1 | | 1/2009 | Seitoku |

FOREIGN PATENT DOCUMENTS

| | | |
|---|---|---|
| EP | 3 141 574 A1 | 3/2017 |
| JP | 2-308870 A | 12/1990 |

(Continued)

OTHER PUBLICATIONS

Computer-generated English-language translation of JP-2002309131-A.*

(Continued)

*Primary Examiner* — Vu A Nguyen
(74) *Attorney, Agent, or Firm* — Birch, Stewart, Kolasch & Birch, LLP

(57) ABSTRACT

Provided are an ink for a PTP package, which is a counterfeit prevention ink for use in a PTP package, has excellent invisibility, can be efficiently read by a scanner having sensitivity in a near infrared region, is highly durable, and can be used for a material of a PTP package, particularly an (Continued)

aluminum substrate; and an ink composition for use therefor. An ink composition for a PTP package, containing vanadyl naphthalocyanine represented by Formula (I):

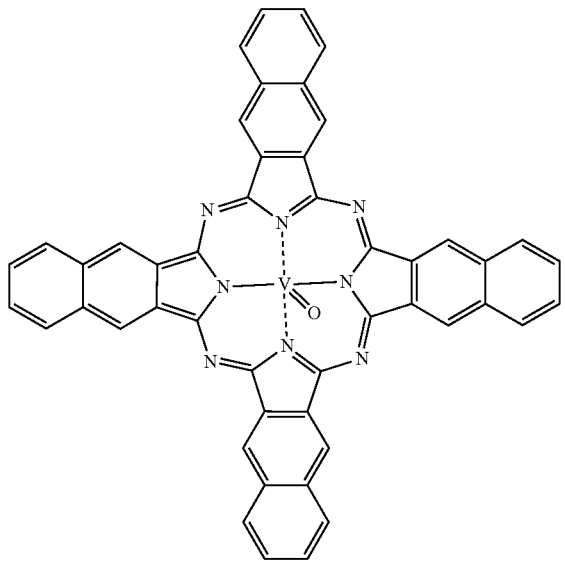

(I)

and a resin. The resin is preferably at least one selected from a cellulose-based resin, a vinyl-based resin, a polyamide-based resin, a polyimide-based resin, an epoxy-based resin, a polyurethane-based resin, a polyester-based resin, a polyester urethane-based resin, a polystyrene-based resin, a polyolefin-based resin, a polyacrylic resin, and a polycarbonate-based resin.

2 Claims, 1 Drawing Sheet

(51) Int. Cl.
B65D 65/42 (2006.01)
B65D 75/32 (2006.01)
C09B 47/04 (2006.01)
C09D 11/107 (2014.01)
C09D 11/108 (2014.01)
C09D 11/50 (2014.01)
C09K 11/06 (2006.01)

(52) U.S. Cl.
CPC .......... *C09D 11/102* (2013.01); *C09D 11/107* (2013.01); *C09D 11/108* (2013.01); *C09D 11/50* (2013.01); *C09K 11/06* (2013.01); *C09K 2211/1022* (2013.01); *C09K 2211/1029* (2013.01); *C09K 2211/183* (2013.01)

(56) References Cited

FOREIGN PATENT DOCUMENTS

| JP | 5-239394 A | 9/1993 | |
|----|----|----|----|
| JP | 7-82517 A | 3/1995 | |
| JP | 2002-309131 A | 10/2002 | |
| JP | 2002309131 A * | 10/2002 | ......... C09B 67/0086 |
| JP | 2007-145428 A | 6/2007 | |
| JP | 2008-202000 A | 9/2008 | |
| JP | 2009-14880 A | 1/2009 | |
| JP | 2015-91718 A | 5/2015 | |
| JP | 2015-199816 A | 11/2015 | |
| JP | 2015199816 A * | 11/2015 | |
| JP | 2018-53135 A | 4/2018 | |
| WO | WO 2015/170374 A1 | 11/2015 | |

OTHER PUBLICATIONS

Computer-generated English-language translation of JP-2015199816-A.*
International Search Report, issued in PCT/JP2018/001692, dated Feb. 27, 2018.
Written Opinion of the international Searching Authority, issued in PCT/JP2018/001692, dated Feb. 27, 2018.
Decision to Grant a Patent dated Feb. 2, 2021, in Japanese Patent Application No. 2018-562472.

* cited by examiner

INK COMPOSITION FOR PTP PACKAGE, AND INK

TECHNICAL FIELD

The present invention relates to an ink composition for a press-through pack (PTP) package. Specifically, the present invention relates to an ink composition for packaging of food, cosmetics, medicine, and the like, particularly for a PTP package used for pharmaceutical products, and an ink for a PTP package containing the ink composition.

More specifically, the present invention relates to an ink composition which is used for a security ink to be printed especially for preventing counterfeiting of a PTP package or checking authenticity of a PTP package, has high durability and excellent invisibility, and can be read efficiently by a scanner having sensitivity in a near infrared region.

BACKGROUND ART

A press-through pack (PTP) package is often used for packaging pharmaceutical products such as tablets and capsules. For example, the PTP package individually stores medicines in a storage recess of a bottom material made of vinyl chloride or the like, and is bonded and covered with a lid material made of aluminum foil or the like.

In pharmaceutical products, counterfeit products are a worldwide problem. According to the World Health Organization (WHO), it is reported that about 10% of pharmaceutical products in the whole world are counterfeit as research results. Accidental drinking of counterfeit products can adversely affect health. There are also legal restrictions to prevent counterfeiting, but currently many counterfeit products are available to consumers on the market.

Therefore, a technology has been developed to enable discrimination between genuine products and counterfeit products in the packaging of pharmaceutical products such as PTP packages. For example, there are PTP packages having a latent image line pattern formed by lines of line portions of a specific pattern and a non-line portion, which are formed by fine embossing on a lid material of an aluminum foil of a PTP package (Patent Document 1), and PTP packages having a convex lens assembly with a plurality of convex lens-like projections formed on an outer surface of a bottom material of a plastic sheet, and a pattern portion having a plurality of patterns disposed on the bottom material side of the lid material, in which patterns can be viewed stereoscopically (Patent Document 2).

However, these methods have the problem that the packaging costs become too high in a case of being used for PTP packages which are consumed in very large quantities. On the other hand, authenticity determining patterns for visual checking will interrupt the printed information such as the code of the pharmaceutical product contained in the package. Further, in a case where the authenticity determining pattern is inexpensive and simple or has a small size, there is also a problem that it is easy to counterfeit a pseudo pattern which is hard to distinguish at first glance.

As a toner for an electrostatic charge image development capable of forming a near infrared absorptive invisible image, Patent Document 3 discloses a toner for an electrostatic charge image development, which contains a phthalocyanine-based compound or a naphthalocyanine-based compound, and contains a nitrogen-containing five-membered heterocyclic compound such as a pyrrole compound or a pyrazole compound. Here, for example, vanadyl naphthalocyanine is used as a near infrared absorber and is dispersed in water in the presence of an anionic surfactant to prepare a near infrared absorber dispersion liquid, and then a toner is produced from the thus-prepared near infrared absorber dispersion liquid together with an additive particle dispersion liquid, a release agent particle dispersion liquid, and a resin particle dispersion liquid (prepared from a solution of styrene, n-butyl acrylate, acrylic acid, or dodecanethiol). However, this toner is difficult to be adhesively matched to PTP packages, particularly aluminum substrates, and it also has insufficient invisibility.

Patent Document 4 discloses a security ink composition, which is an acrylate-based ultraviolet curable ink, containing a naphthalocyanine compound having a substituent and the like and an ultraviolet absorber. Although the purpose of Patent Document 4 is to prevent counterfeiting of prepaid cards, gift certificates, securities, and the like, this ink exhibits insufficient invisibility because the absorption peak is on the short wavelength side and broad. Further, this ink is difficult to be adhesively matched to PIP packages, particularly aluminum substrates, and also has low heat resistance.

In addition, it is currently practiced to print information (such as product name, serial number, expiration date, and the like) of the material to be packaged on the PTP package, but in a case where a bar code or the like is printed on the aluminum substrate side of the PTP package, it is difficult to accurately read the bar code information or the like due to the reflection properties of aluminum.

Thus, no ink has been developed for printing invisible information for the authenticity determining of inclusions in PTP packages, and conventional security inks could not be applied to PTP packages, in particular to aluminum substrates.

RELATED DOCUMENT

Patent Document

[Patent Document 1] JP2007-145428
[Patent Document 2] JP2015-91718
[Patent Document 3] JP2009-014880
[Patent Document 4] JPH07-082517

SUMMARY OF THE INVENTION

Technical Problem

An object of the present invention is to provide an ink for a PTP package, which is a counterfeit prevention ink for use in a PTP package, has excellent invisibility, can be efficiently read by a scanner having sensitivity in a near infrared region, is highly durable, and can be used for a material of a PTP package, particularly an aluminum substrate; and an ink composition for use therefor.

Solution to Problem

The present inventors have found that the above-mentioned object can be achieved by an ink composition containing a specific naphthalocyanine compound and a resin. The present invention has been completed based on these findings. That is, the present invention provides the following.

(1) An ink composition for a press-through pack (PTP), including vanadyl naphthalocyanine represented by Formula (I):

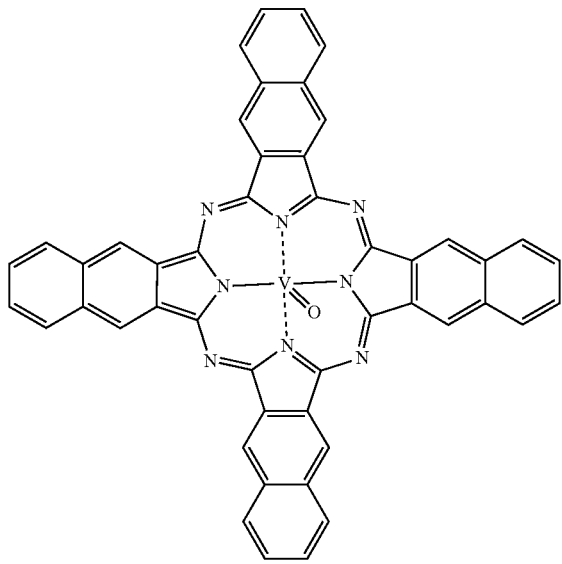

and a resin.

(2) The ink composition for a PTP package according to (1), in which the resin is at least one selected from a cellulose-based resin, a vinyl-based resin, a polyamide-based resin, a polyimide-based resin, an epoxy-based resin, a polyurethane-based resin, a polyester-based resin, a polyester urethane-based resin, a polystyrene-based resin, a polyolefin-based resin, a polyacrylic resin, and a polycarbonate-based resin.

(3) The ink composition for a PTP package according to (1) or (2), in which the resin is a polycarbonate-based resin.

(4) The ink composition for a PTP package according to any one of (1) to (3), in which a recorded image has an absorption maximum in a wavelength range of 750 to 900 nm.

(5) An ink for a PTP package, including the ink composition for a PTP package according to any one of (1) to (4) and a solvent.

(6) A PTP package obtained by applying the ink composition for a PTP package according to any one of (1) to (4) to an aluminum substrate of a PTP package having an aluminum substrate in a structure thereof.

Advantageous Effects of Invention

By the ink composition for a PTP package according to the present invention, an ink for a PTP package could be realized which has excellent invisibility, can be efficiently read by a scanner having sensitivity in a near infrared region, is highly durable, and can be used for a material of a PTP package, particularly an aluminum substrate. As a result, it has become possible to inexpensively produce a PTP package printed with security information which does not prevent the designability and the printed code of the PTP package, is difficult to counterfeit, has excellent durability and adhesion, and can be read by a reading device using near-infrared light, such as an infrared bar code reader with a wavelength of 750 to 900 nm.

DESCRIPTION OF EMBODIMENTS

Figure 1:
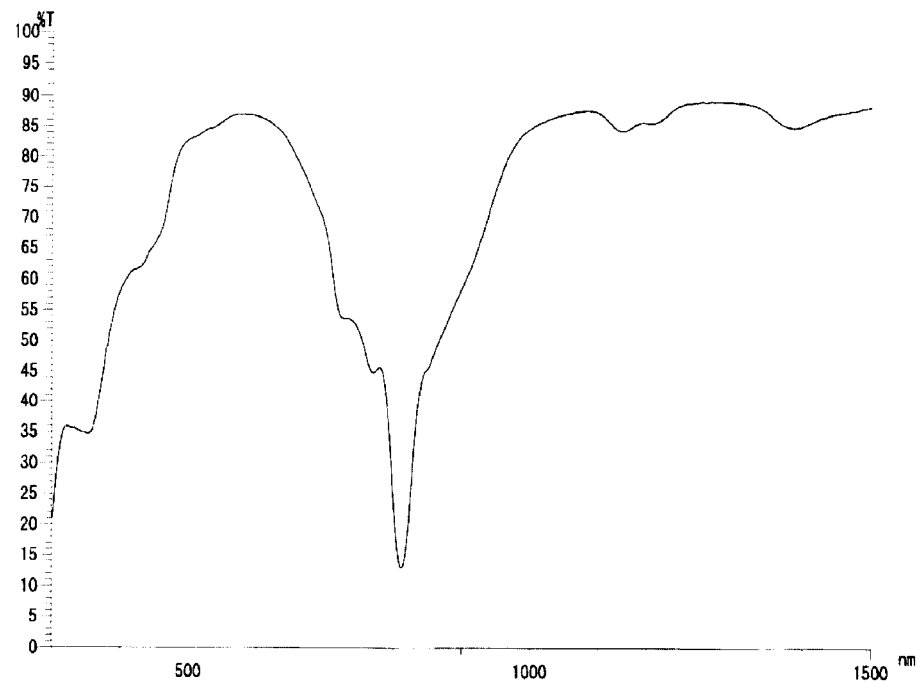
FIG. 1 is a transmission spectrum diagram of a sample in which an ink composition layer of Example 1 is formed.

Hereinafter, the present invention will be described in detail.

<Ink Composition for PTP Package>

The ink composition for a PTP package according to the present invention contains vanadyl naphthalocyanine represented by Formula (I) and a resin.

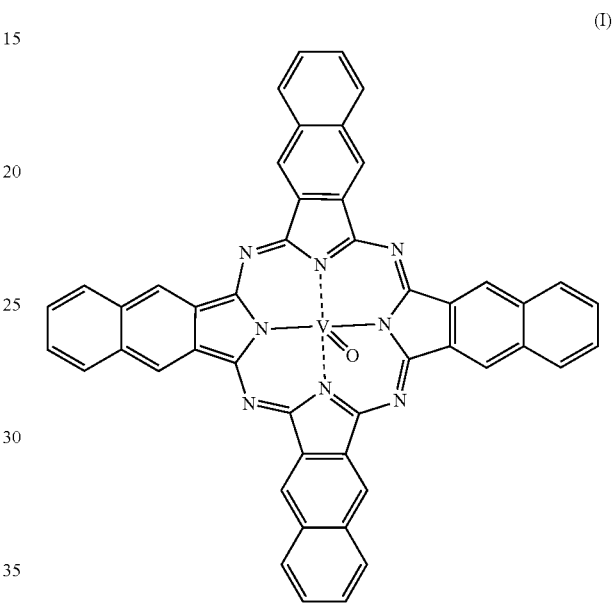

Although the compositional ratio of vanadyl naphthalocyanine to resin is not specified uniformly because it varies depending on the thickness of the printing layer in a case of being used as an ink, the amount of near infrared absorption required for reading, or the like, the amount of vanadyl naphthalocyanine is usually 0.01% to 20% by weight and more preferably 0.1% to 10% by weight, with respect to the resin.

In a case where the ink composition for a PTP package according to the present invention is used for a PTP package, the recorded image is substantially invisible. The phrase "substantially invisible" means that it is difficult to visually confirm the printed information or the print itself cannot be recognized because the coloration is very low.

In a case where the ink composition for a PTP package according to the present invention is used for a PTP package, the recorded image has an absorption maximum in the wavelength range of 750 to 900 nm. For this reason, the recorded image can be read by a reading device using near-infrared light, such as an infrared bar code reader with a wavelength of 750 to 900 nm, or an authenticity determination machine corresponding to a wavelength of 850 nm used for checking banknotes, securities, and the like.

The vanadyl naphthalocyanine represented by Formula (I) has very excellent durability and near infrared absorbing ability, but in a case of being used for an invisible ink such as security ink, it may show some coloration. However, in a case where the ink composition for a PTP package according to the present invention is applied to a PTP package, particularly to an aluminum substrate of the PTP package, the invisibility is high and visual recognition is impossible.

Further, the invisible ink is less affected by the light reflection properties of the aluminum substrate upon comparing with the conventional invisible ink, and information that is invisible to visual observation can be read reliably by an infrared reading device.

<Resin>

Examples of the resin contained in the ink composition for a PTP package according to the present invention include a cellulose-based resin, a polyolefin-based resin, a poly(meth)acrylic resin, a polyacrylamide-based resin, an acrylic-modified urethane-based resin, a styrene/acrylic-based resin, an ethylene/acrylic-based resin, a polyvinyl chloride-based resin, a polyvinyl acetate-based resin, a vinyl chloride-vinyl acetate copolymer, a polystyrene-based resin, a styrene-butadiene copolymer, a vinylidene fluoride-based resin, a polyvinyl alcohol-based resin, a polyvinyl acetal-based resin, a polyvinyl butyral-based resin, a polybutadiene-based resin, a polyester-based resin, a polyester urethane-based resin, a rosin-modified maleic resin, a polyamide-based resin, an alkyd-based resin, an epoxy-based resin, an unsaturated polyester-based resin, a thermosetting poly(meth)acrylic resin, a melamine-based resin, a urea-based resin, a polyurethane-based resin, a phenol-based resin, an aromatic ester-based resin, and a xylene-based resin, and the like. In particular, a cellulose-based resin, a vinyl-based resin, a polyamide-based resin, a polyimide-based resin, an epoxy-based resin, a polyurethane-based resin, a polyester-based resin, a polyester urethane-based resin, a polystyrene-based resin, a polyolefin-based resin, a polyacrylic-based resin, and a polycarbonate-based resin are preferable. In particular, a polycarbonate-based resin is more preferable in terms of durability and the like.

Examples of the cellulose-based resin include nitrocellulose, ethyl cellulose, acetyl butyl cellulose, cellulose acetate, cellulose acetate butyrate, cellulose acetate propionate, and ethyloxyethyl cellulose.

Examples of the vinyl-based resin include vinyl chloride, vinyl acetate, a vinyl chloride-vinyl acetate copolymer resin, a vinyl chloride-acrylic copolymer resin, ethylene-vinyl acetate, and an aromatic vinyl-based resin.

Examples of the polyamide-based resin include polycapramide (nylon-6), poly-ω-aminoheptanoic acid (nylon-7), poly-ω-aminononanoic acid (nylon-9), polyundecane amide (nylon-11), polylauryl lactam (nylon-12), polyethylenediamine adipamide (nylon-2,6), polytetramethylene adipamide (nylon-4,6), polyhexamethylene adipamide (nylon-6,6), polyhexamethylene sebacamide (nylon-6,10), polyhexamethylene dodecamide (nylon-6,12), polyoctamethylene adipamide (nylon-8,6), polydecamethylene adipamide (nylon-10,8), a caprolactam/lauryl lactam copolymer (nylon-6,12), nylon-6T consisting of hexamethylenediamine and terephthalic acid, nylon-6I consisting of hexamethylenediamine and isophthalic acid, nylon-9T consisting of nonanediamine and terephthalic acid, and nylon-M5T consisting of methylpentadiamine and terephthalic acid.

Examples of the polyimide-based resin include a polyamide acid obtained by reacting a diamine compound and a tetracarboxylic dianhydride, and a partially imidized polymer of such a polyamide acid. For example, it is exemplified by a polyimide resin which is obtained by polymerization of a diamine such as o-phenylenediamine, m-phenylenediamine, p-phenylenediamine, 4,4'-diaminodiphenylether, 1,4-bis(aminomethyl)cyclohexane, 1,3-bis(aminomethyl)cyclohexane, 1,3-propanediamine, 1,4-butanediamine, 1,5-pentanediamine, or 1,6-hexanediamine with a tetracarboxylic dianhydride such as 4,4'-hexafluoropropylidene bisphthalic dianhydride, 4,4'-biphthalic anhydride, diphenyl-2,3,3',4'-tetracarboxylic dianhydride, diphenyl-2,2',3,3'-tetracarboxylic dianhydride, or pyromellitic dianhydride.

Examples of the epoxy-based resin include a polyepoxide, an aromatic polyepoxy compound, a glycidyl ether of polyhydric phenol, a glycidyl ester of polyhydric phenol, a glycidyl aromatic polyamine, an alicyclic polyepoxy compound, an aliphatic polyepoxy compound, a polyglycidyl ester of polyvalent fatty acid, a bisphenol type epoxy resin such as bisphenol A epoxy resin or bisphenol F epoxy resin, a novolac type epoxy resin such as novolac epoxy resin or cresol novolac epoxy resin, a biphenyl type epoxy resin, a stilbene type epoxy resin, a triphenolmethane type epoxy resin, an alkyl-modified triphenolmethane type epoxy resin, a triazine nucleus-containing epoxy resin, and a dicyclopentadiene-modified phenol type epoxy resin.

For example, a polyurethane-based resin obtained by the reaction of polyfunctional isocyanate and a hydroxyl group-containing compound can be used as the polyurethane-based resin. Examples of the polyurethane-based resin include a one-component or two-component curing type polyurethane resin obtained by the reaction of polyfunctional isocyanate, for example, aromatic polyisocyanate such as tolylene diisocyanate, diphenylmethane diisocyanate, or polymethylenepolyphenylene polyisocyanate, or aliphatic polyisocyanate such as hexamethylene diisocyanate or xylylene diisocyanate, with polyether-based polyol, polyester-based polyol, polyacrylate polyol, or other hydroxyl group-containing compounds. In addition, a polyurethane-based resin such as polyester polyurethane, polyether polyurethane, polyether polyester polyurethane, polycarbonate polyurethane, or polycaprolactam polyurethane, and a mixture thereof can be exemplified.

Examples of the polyester-based resin include polyethylene terephthalate, polyethylene naphthalate, polybutylene terephthalate, polybutylene naphthalate, polytrimethylene terephthalate, polycyclohexylene dimethylene terephthalate, polycyclohexylene dimethylene naphthalate, polybutylene terephthalate, polybutylene naphthalate, polylactic acid, liquid crystal polyester, various copolymerized polyester resins, various modified polyester resins, various modified copolymerized polyester resins, and various polyester-based elastomers.

Examples of the polyester urethane-based resin include thermoplastic polyester urethane resins such as linear block copolymers obtained by the reaction of polyester polyols, which are obtained by the polycondensation reaction of glycols such as ethylene glycol, propylene glycol, neopentyl glycol, and 1,6-hexane glycol with dibasic acids such as adipic acid, isophthalic acid, and terephthalic acid, with isocyanates such as tolylene diisocyanate, isophorone diisocyanate, and hexamethylene diisocyanate.

Examples of the polystyrene-based resin include general purpose polystyrene (GPPS), a styrene-butadiene copolymer (for example, SBS), a styrene-butadiene-isoprene copolymer (SBIS), a styrene-acrylic acid ester copolymer, a styrene-isobutylene copolymer, an acrylonitrile-styrene copolymer (AS resin), an acrylonitrile-butadiene-styrene copolymer (ABS resin), and a polystyrene-maleic anhydride resin.

Examples of the polyolefin-based resin include polyethylene, chlorinated polyethylene, polypropylene, chlorinated polypropylene, polybutene, polybutadiene, polyisoprene, a copolymer of ethylene and α-olefin having 4 or more carbon atoms (linear low density polyethylene), an ethylene-acrylic acid copolymer, an ethylene-methyl acrylate copolymer, an ethylene-ethyl acrylate copolymer, an ethylene-methacrylic acid copolymer, an ethylene-vinyl acetate copolymer (EVA), an ethylene-vinyl acetate copolymer saponified product, and an ionomer. In addition, a cycloolefin copolymer (COC), cycloolefin polymer (COP), or the like, which uses a cyclic olefin as a monomer, is preferably used.

Examples of the polyacrylic-based resin include polyacrylamide, polymethacrylamide, polymethyl methacrylate (PMMA), a (meth)acrylamide-diacetone acrylamide copolymer, a (meth)acryloyl morpholine-diacetone acrylamide copolymer, polyacryl morpholine, a polyvinylimidazole-diacetone acrylamide copolymer, a vinylpyrrolidone-(meth)acrylamide copolymer, poly(N,N-dimethyl acrylamide), a vinyl pyrrolidone-N, N-dimethyl acrylamide copolymer, and an N,N-dimethyl acrylamide-acrylamide copolymer.

Examples of the polycarbonate-based resin include resins compounds that are obtained by a polycondensation reaction of a bisphenol derivative and phosgene or diphenyl carbonate. It is also possible to use polyester carbonates which partly contain terephthalic acid and/or isophthalic acid components. Examples of the bisphenol derivative include 2,2-bis(4-hydroxyphenyl)propane (bisphenol A), bis(4-hydroxyphenyl)methane, 1,1-bis(4-hydroxyphenyl) cyclohexane, 9,9-bis(4-hydroxyphenyl)fluorene, 1,1-bis(4-hydroxyphenyl)-3,3,5-trimethylcyclohexane, 2,2-bis(4-hydroxy-3-methylphenyl)propane, 2,2-bis(4-hydroxyphenyl)-2-phenylethane, 2,2-bis(4-hydroxyphenyl)-1,1,1,3,3,3-hexafluoropropane, bis(4-hydroxyphenyl) diphenylmethane, bis(4-hydroxyphenyl)sulfide, and bis(4-hydroxyphenyl) sulfone. Further, the bisphenol derivative also includes those in which the hydrogen group of these phenyl groups is partially substituted by a methyl group or a halogen group.

In addition, it is also possible to use a photocurable resin or the like, specific examples of which include an unsaturated polyester-based resin, an acrylate-based resin, a polyene/polythiol-based resin, a spirane-based resin, an epoxy-based resin, an amino alkyd-based resin, a diallyl phthalate-based resin, an unsaturated polyester-based resin, and a furan-based resin. Along with these resins, various monomers such as UV curable monomers, prepolymers, and photopolymerization initiators are used as needed.

<Ink for PTP Package>

The ink for a PTP package according to the present invention contains the ink composition fora PTP package according to the present invention and a solvent, and further contains other additives as required.

In the present invention, the solvent contained in the ink for a PTP package includes a solvent that dissolves the ink composition for a PTP package according to the present invention, as well as a dispersion medium that partially dissolves the ink composition for a PTP package, a dispersion medium which is hardly soluble in the ink composition for a PTP package, an aqueous solvent, and the like. In the present invention, these are collectively referred to as a solvent.

The ink for a PTP package is printed on the PTP package and, after being dried and solidified, contains the ink composition for a PTP package according to the present invention and an additive optionally added.

<Other Additives>

Examples of the above-mentioned additive, which is optionally blended in the ink for a PTP package according to the present invention, include additives such as a filler, a stabilizer, a plasticizer, an antioxidant, a light stabilizer such as UV absorber, a dispersant, a thickener, a desiccant, a lubricant, an antistatic agent, a crosslinking agent, a polyethylene wax for improving abrasion resistance, and a silicon dioxide for blocking prevention.

In addition, a polymerizable compound and a polymerization initiator may be further blended in the ink for a PTP package according to the present invention.

Examples of the polymerizable compound include an acrylic acid, a methacrylic acid, an itaconic acid, a crotonic acid, an isocrotonic acid, a maleic acid, an anhydride having an ethylenically unsaturated group, a radical polymerizable compound such as acrylonitrile, and a cationic polymerizable compound applied to a photocurable resin of a photo cationic polymerization system.

A known polymerization initiator can be used as the polymerization initiator. The polymerization initiator is selected from those compatible with the above-mentioned polymerizable compound. A radical polymerization initiator is selected for the radical polymerizable compound and a cationic polymerization initiator is selected for the cationic polymerizable compound.

<Process for Producing Ink for PTP Package>

The ink for a PTP package according to the present invention is produced by dissolving or dispersing the ink composition for a PTP package according to the present invention and, if necessary, the above-mentioned additive in a solvent. The additive may be blended in the ink composition in advance, and the ink composition may be dissolved and dispersed in a solvent to produce an ink for a PTP package. As the ink composition fora PTP package, a melt mixture of vanadyl naphthalocyanine and a resin, or one obtained by pulverizing an extrusion-molded product may be used.

Examples of the organic solvent include an aromatic hydrocarbon such as toluene or xylene; an aliphatic hydrocarbon such as n-hexane; an alicyclic hydrocarbon such as methylcyclohexane; an ester such as methyl acetate or ethyl acetate; a ketone such as cyclohexanone, methyl ethyl ketone, or methyl isobutyl ketone; an ether such as tetrahydrofuran; an alcohol-based solvent such as ethanol, isopropyl alcohol, 1-methoxy-2-propanol, or modified alcohol; or a mixed solvent thereof.

In addition, water or an aqueous solvent such as a mixture of water and an alcohol-based solvent can also be used.

The content of the solvent can be appropriately determined in accordance with the type of solvent and resin to be used, and the like, but is generally about 40 to 95% by weight and particularly preferably 50 to 90% by weight in the ink of the present invention. Ina case where the content of the solvent is less than 40% by weight, the ink viscosity is high, and in a case where the content of the solvent is more than 95% by weight, the printability is lowered due to the low viscosity of the ink, thus resulting in blurring of printing, clogging of the printing plate, and the like.

These components are blended simultaneously or sequentially, and uniformly dissolved and mixed using a known stirrer such as a mixer, homogenizer, or dissolver to produce an ink. As a disperser used in a case of producing a printing ink by dispersion, a paint conditioner, a ball mill, a sand mill, an attritor, a pearl mill, a co-ball mill, a homomixer, a homogenizer, a wet jet mill, a wet bead mill, a nanomizer, or the like can be mentioned. In a case of using a medium for the disperser, it is preferable to use glass beads, zirconia beads, alumina beads, magnetic beads, styrene beads, or the like.

<Use of Ink of Present Invention for PTP Package>

The Press-through pack (PTP) package is configured in such a manner that a transparent plastic film or sheet is formed by hot vacuum forming, hot pressure forming, hot vacuum pressure forming, or the like into a pocket with a depth of 20 mm or less, or a small deep drawn container, a solid pharmaceutical product, food, or the like is filled in the pocket or container, and then the opening thereof is sealed and packaged with a lid material such as aluminum foil. The PTP package is often used for packaging pharmaceutical products, health food tablets, capsules, and the like.

The ink of the present invention may be applied to either the aluminum substrate (the aluminum foil of the lid material) or plastic of the PTP package, but it is preferably applied to the aluminum substrate, which usually has a marking such as a chemical name. In addition, application to an aluminum substrate includes the case of use on the surface visible from the plastic side of the aluminum substrate.

The aluminum substrate may further have a resin overcoat layer, a primer layer, and the like in some cases. That is, application to an aluminum substrate in the present invention includes application to an overcoat layer, a primer layer, and the like on the aluminum substrate.

A known aluminum substrate can be used as the aluminum substrate (foil) used for the aluminum substrate of the PTP package. Although not particularly limited, an aluminum substrate having a thickness of 5 μm to 50 μm and an aluminum purity of 98.0 to 99.9% by weight can be preferably used. According to JIS H4160, an aluminum substrate such as 1000 series (1N30, 1070, or the like), 3000 series, or 8000 series (8021, 8079, or the like) can be used, and any of a hard material (H material (JIS H0001)), a semi-hard material, and a soft material (O material (JIS H0001)) can be used also in terms of refining (temper). Particularly a hard material is preferable. In addition, one surface is called a glossy surface and the other surface is called a glossless surface (matte surface), and the glossiness of both surfaces differs in a normal aluminum substrate. In the present invention, the ink may be applied to either the glossy surface or the glossless surface, but in particular, it is more preferable to apply the ink to the glossless surface (matte surface) in terms of invisibility of printed information and reading accuracy.

In order to apply the ink of the present invention to a PTP package, coating and application are carried out by known printing and coating methods such as gravure printing, offset printing, flexo printing, inkjet printing, printing by a thermal transfer method or the like, a gravure roll coater, and a curtain flow coater.

The following configuration may be mentioned as an aspect applied to the aluminum substrate side of a PTP package. For example, the aluminum substrate+ink layer is a configuration in which the ink is printed on the aluminum substrate.

1. Aluminum substrate+ink layer
2. Aluminum substrate+ink layer+overcoat layer
3. Aluminum substrate+primer layer+ink layer
4. Aluminum substrate+primer layer+ink layer+overcoat layer There is also an embodiment in which a white layer (white ink layer) is further provided on the aluminum substrate side of the PTP package in order to clarify the printing of a chemical name or the like, and even in such an embodiment, the ink of the present invention can be applied thereon.

The presence of the primer layer improves the adhesiveness between the aluminum substrate and the ink.

Although the thickness of the ink layer (formation layer of the ink composition) on which the ink of the present invention is printed cannot be specified uniformly because it is related to the concentration of vanadyl naphthalocyanine in the ink, the sensitivity of the infrared detector used, or the like, the thickness of the ink layer is preferably about 0.1 to 50 μm, and in view of invisibility, more preferably about 0.2 to 20 μm.

In a case where the ink of the present invention is applied to the aluminum substrate side of the PTP package, the invisibility is further enhanced due to the reflection of the aluminum substrate, and visual recognition is substantially impossible. In addition, information that is less affected by the light reflection properties of the aluminum substrate and is invisible to visual observation can be read reliably by an infrared detector and an infrared reading device.

In a case of applying the ink of the present invention to a PTP package, the printed information may be information on a substance to be enclosed in the PTP package, such as the type of medicine, or name of a manufacturing company, or may be a hidden mark for mere determination of authenticity or a simple form. The print format may be a bar code capable of writing a large amount of various information, a two-dimensional code such as QR code (registered trademark), dots, or the like, or may be characters such as alphanumeric characters, Japanese syllabary characters, or Chinese characters. In addition, it may be a specific pattern for determination of authenticity or a simple mark, which does not contain information.

The ink composition of the present invention has durability such as very excellent light resistance, so that detection ability (such as readability) in a case of being detected by an infrared reading device can be kept stable over a long period of time.

<Method of Detecting Printed Information>

The detection and reading of printed information in the PTP package on which the ink of the present invention is printed are carried out by irradiating the surface on which the printed information is recorded with near-infrared light using an infrared detector capable of detecting near-infrared light, an infrared reading device, or the like. It is difficult to visually recognize the printed information, but in a case where near-infrared light is irradiated, it is possible to detect the reflected light at the time of irradiation and read the information since the printed information region absorbs the near-infrared light.

The infrared detector preferably uses near-infrared light having a wavelength of 700 to 1200 nm, particularly 750 to 900 nm. For example, a code reader, a scanner, a handy terminal, an infrared camera, or a securities authenticity determination machine using the above-mentioned wavelength can be mentioned.

EXAMPLES

Hereinafter, the present invention will be more specifically described with reference to Examples and Comparative Examples, but the present invention is not limited to the following Examples.

Example 1

2 parts by weight of vanadyl naphthalocyanine powder and 100 parts by weight of a pellet of a polycarbonate resin having a repeating structural unit represented by the following formula:

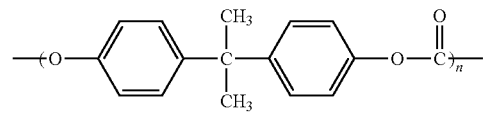

were kneaded and dissolved at 280° C. to 290° C. using an extruder. This was followed by cooling and coarse grinding with a hammer mill. 20 parts by weight of the powder of the obtained ink composition and 160 parts by weight of tetrahydrofuran were particulate-dispersed for 15 minutes with a wet bead mill to prepare an ink. The ink was applied onto a transparent PET film using a wire bar and dried to produce a sample having an ink composition layer with a thickness of about 1.0 μm. The transmission spectrum of this sample (as measured by Hitachi High-Technologies Corporation: U-4100 spectrophotometer) is shown in FIG. 1. This sample had a sharp absorption peak at around 810 nm and was almost uncolored.

Example 2

The ink prepared in Example 1 was used to print a bar code on a matte surface (glossless surface) of an aluminum foil having a thickness of 20 μm as defined in JIS 1N30 using a small gravure printing machine with a 20 μm plate depth (printing speed: 40 m/min, drying temperature: 60° C.). The printed portion could not be confirmed visually.

The printed information was read using an infrared bar code reader at a reading wavelength of 860 nm, and the hidden bar code could be read.

Example 3

10 parts by weight of a pellet of a polycarbonate resin having a repeating structural unit represented by the following formula:

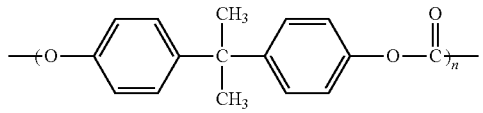

was heated and dissolved in 80 parts by weight of tetrahydrofuran at about 50° C., which was then allowed to cool to room temperature to prepare a resin solution.

0.2 parts by weight of vanadyl naphthalocyanine powder was added to this solution and then those were particulate-dispersed for 15 minutes with a wet bead mill to prepare an ink. The ink was applied onto a transparent PET film using a wire bar and dried to produce a sample having an ink composition layer with a thickness of about 1.0 μm. This sample was slightly more colored than the sample of Example 1.

Example 4

The ink prepared in Example 3 was used to print a bar code on a matte surface (glossless surface) of an aluminum foil having a thickness of 20 μm as defined in JIS 1N30 using a small gravure printing machine with a 20 μm plate depth (printing speed: 40 m/min, drying temperature: 60° C.). The printed portion could not be confirmed visually.

The printed information was read using an infrared bar code reader at a reading wavelength of 860 nm, and the hidden bar code could be read.

Example 5

10 parts by weight of a pellet of polymethyl methacrylate (PMMA) was dissolved in 80 parts by weight of ethyl acetate to prepare a resin solution. 0.2 parts by weight of vanadyl naphthalocyanine powder was added to this solution and then those were particulate-dispersed for 15 minutes with a wet bead mill to prepare an ink. The ink was applied onto a transparent PET film using a wire bar and dried to produce a sample having an ink composition layer with a thickness of about 1.0 μm.

Figure 2:
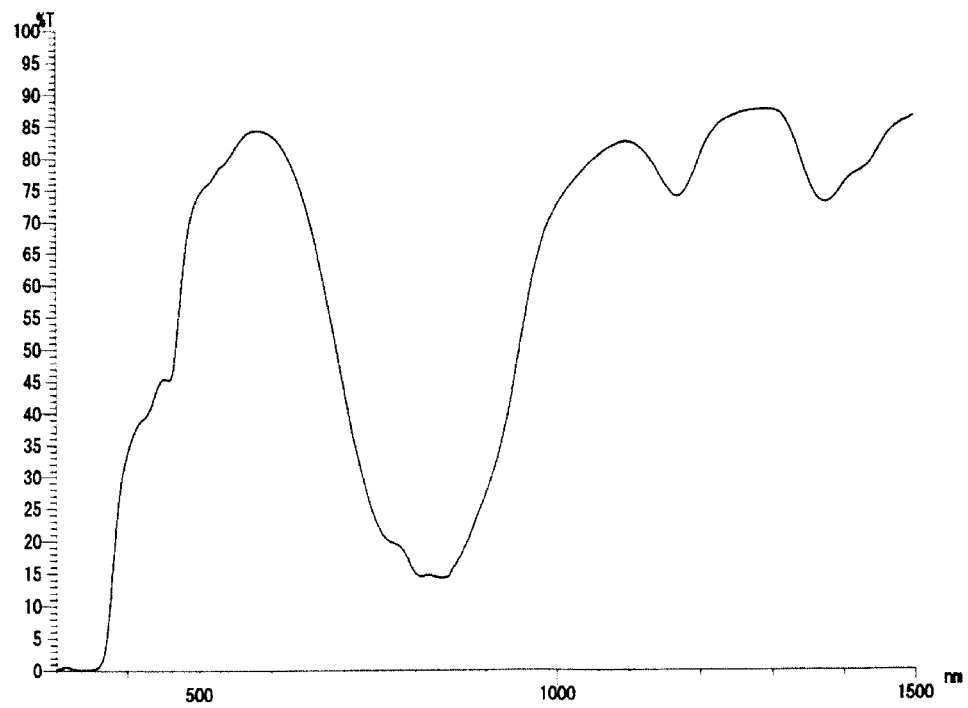
FIG. 2 is a transmission spectrum diagram of a sample in which an ink composition layer of Example 5 is formed.

The transmission spectrum of this sample is shown in FIG. 2.

This sample had a slightly broad absorption peak at around 750 to 900 nm and was slightly more colored than the sample of Example 1.

Example 6

The ink prepared in Example 5 was used to print a bar code on the matte surface of an aluminum foil in the same manner as in Example 2. The printed portion could not be confirmed visually. The printed information was read using an infrared bar code reader at a reading wavelength of 860 nm, and the hidden bar code could be read.

Example 7

10 parts by weight of a pellet of cycloolefin copolymer (trade name: APEL, manufactured by Mitsui Chemicals, Inc.) was dissolved in 80 parts by weight of xylene to prepare a resin solution. 0.2 parts by weight of vanadyl naphthalocyanine powder was added to this solution and then those were particulate-dispersed for 15 minutes with a wet bead mill to prepare an ink. This ink was used to print a bar code on the matte side of an aluminum foil in the same manner as in Example 2. The printed portion could not be confirmed visually. The printed information was read using an infrared bar code reader at a reading wavelength of 860 nm, and the hidden bar code could be read.

Example 8

10 parts by weight of polyvinyl butyral resin powder was dissolved in 80 parts by weight of a mixed solvent of ethanol/toluene=1/1 to prepare a resin solution. 0.2 parts by weight of vanadyl naphthalocyanine powder was added to this solution and then those were particulate-dispersed for 15 minutes with a wet bead mill to prepare an ink.

This ink was used to print a bar code on the matte side of an aluminum foil in the same manner as in Example 2. The printed portion could not be confirmed visually. The printed information was read using an infrared bar code reader at a reading wavelength of 860 nm, and the hidden bar code could be read.

Comparative Example 1

An ink was prepared in the same manner as in Example 1, except that 0.1 part by weight of the following naphthalocyanine compound was used in place of 0.1 part by weight of vanadyl naphthalocyanine in Example 1. In addition, the same procedure as in Example 1 was carried out to produce a sample in which an ink composition layer was formed on a transparent PET film.

This sample had an absorption peak at around 700 to 850 nm and was slightly colored.

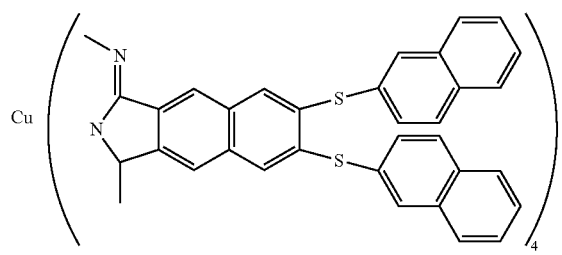

Comparative Example 2

The ink prepared in Comparative Example 1 was used to print a bar code on the matte surface of an aluminum foil in the same manner as in Example 2. The printed portion was slightly colored and therefore could be confirmed visually.

Comparative Example 3

The ink prepared in Example 8 was used to print a bar code on white PET synthetic paper. The printed portion was slightly colored and therefore could be confirmed visually.

INDUSTRIAL APPLICABILITY

By the ink composition for a PTP package according to the present invention, an ink for a PTP package could be realized which has excellent invisibility, can be efficiently read by a scanner having sensitivity in a near infrared region, is highly durable, and can be used for a material of a PTP package, particularly an aluminum substrate.

Therefore, the ink composition for a PTP package according to the present invention can be used for preventing counterfeiting or printing identification information in many fields, such as a PTP package used for packaging of food, cosmetics, medicines, and the like.

The invention claimed is:

1. A press-through pack (PTP) package obtained by applying an ink composition for a PTP package to an aluminum substrate of the PTP package having the aluminum substrate in a structure thereof, wherein the ink composition for the PTP package comprises:
vanadyl naphthalocyanine represented by formula (I):

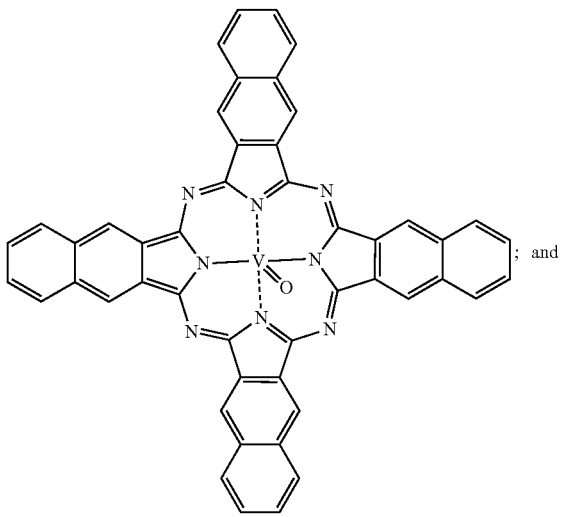

a polycarbonate-based resin.

2. A press-through pack (PTP) package obtained by applying an ink for a PTP package to an aluminum substrate of the PTP package having the aluminum substrate in a structure thereof, wherein the ink for the PTP package comprises:
vanadyl naphthalocyanine represented by formula (I):

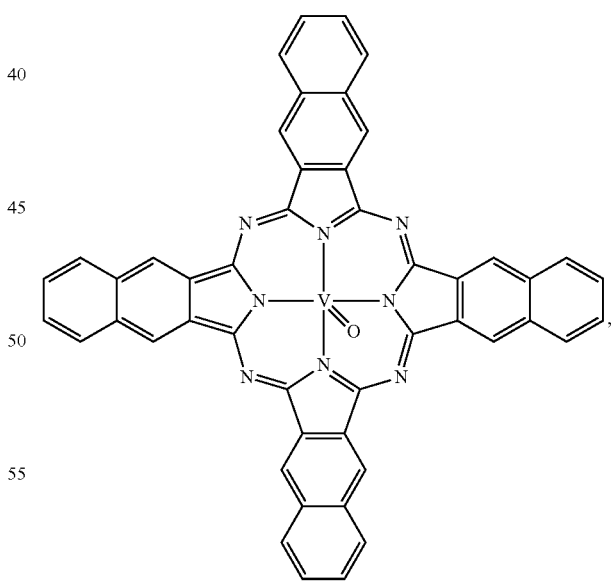

a polycarbonate-based resin, and a solvent.

* * * * *